US008140192B2

(12) United States Patent
Liao et al.

(10) Patent No.: US 8,140,192 B2
(45) Date of Patent: Mar. 20, 2012

(54) SYSTEM AND METHOD TO PROGRAM AIR CONDITIONER MODULES

(75) Inventors: Xu Qiang Liao, Manlius, NY (US); Lisa L. Weyna, Manlius, NY (US)

(73) Assignee: Carrier Corporation, Farmington, CT (US)

(*) Notice: Subject to any disclaimer, the term of this patent is extended or adjusted under 35 U.S.C. 154(b) by 300 days.

(21) Appl. No.: 12/520,947

(22) PCT Filed: Dec. 26, 2006

(86) PCT No.: PCT/US2006/049337
§ 371 (c)(1),
(2), (4) Date: Jun. 23, 2009

(87) PCT Pub. No.: WO2008/079136
PCT Pub. Date: Jul. 3, 2008

(65) Prior Publication Data
US 2010/0063635 A1    Mar. 11, 2010

(51) Int. Cl.
G05B 21/00    (2006.01)
G05B 13/00    (2006.01)
G05B 15/00    (2006.01)
G05B 19/18    (2006.01)
G05B 11/01    (2006.01)
G01M 1/38    (2006.01)
G05D 23/00    (2006.01)
G05D 1/00    (2006.01)
G05D 3/00    (2006.01)
G06F 7/00    (2006.01)
G06F 17/00   (2006.01)
G06F 15/16   (2006.01)
G06F 13/00   (2006.01)

(52) U.S. Cl. .......... 700/276; 700/4; 700/20; 701/2; 701/36; 709/253; 710/100

(58) Field of Classification Search .............. 700/11, 700/17–20, 275–277, 2–4; 701/1, 2, 29, 701/36; 709/249, 253; 710/100, 105
See application file for complete search history.

(56) References Cited

U.S. PATENT DOCUMENTS
6,295,826 B1    10/2001   Lee
(Continued)

FOREIGN PATENT DOCUMENTS
DE    10121258 A1    11/2002
(Continued)

OTHER PUBLICATIONS

Report on Cost-Effectiveness and Energy Saving from Application of Low-Cost Wireless Sensing, Pacific Northwest National Laboratory, M. Kintner-Meyer, J. Skorpic and L. Reid, Dec. 2004, Prepared for the U.S. Department of Energy, Prepared for the U.S. Department of Energy under Contract DE-AC06-76RL01830; PNNL-15018, 26 pages.

(Continued)

Primary Examiner — Crystal J Barnes-Bullock
(74) Attorney, Agent, or Firm — Cantor Colburn LLP

(57) ABSTRACT

A system to program microcomputers associated with a plurality of bus rooftop air conditioners comprises a plurality of air conditioner modules located on a bus rooftop. Each air conditioner module includes a microcomputer. Each microcomputer is connected to a CAN (computer area network) bus connection, and the CAN bus is common to each microcomputer. The system also includes a programming device that is communicatively coupled to at least one of the microcomputers of one of the plurality of air conditioner modules, wherein the programming device transfers a software update to the at least one of the microcomputers followed by the at least one of the microcomputers transferring the software update to each of the microcomputers in the of air conditioner modules located on a bus rooftop. A method for programming a plurality of microcomputers contained within a plurality of bus air conditioning modules is also presented.

10 Claims, 3 Drawing Sheets

U.S. PATENT DOCUMENTS

| | | | |
|---|---|---|---|
| 6,338,437 B1 * | 1/2002 | Kline et al. | 236/49.3 |
| 6,434,450 B1 * | 8/2002 | Griffin et al. | 701/1 |
| 6,923,281 B2 * | 8/2005 | Chernoff et al. | 180/65.245 |
| 6,925,826 B2 | 8/2005 | Hille et al. | |
| 6,978,627 B2 * | 12/2005 | Masui et al. | 62/127 |
| 7,089,089 B2 * | 8/2006 | Cumming et al. | 700/295 |
| 7,296,426 B2 * | 11/2007 | Butler et al. | 62/181 |
| 7,389,806 B2 * | 6/2008 | Kates | 160/5 |
| 7,401,757 B2 * | 7/2008 | Lomp | 248/681 |
| 7,809,472 B1 * | 10/2010 | Silva et al. | 700/277 |
| 8,019,487 B2 * | 9/2011 | Goto et al. | 701/1 |
| 2003/0216837 A1 | 11/2003 | Reich et al. | |
| 2005/0040248 A1 | 2/2005 | Wacker et al. | |
| 2005/0068191 A1 * | 3/2005 | Eschke et al. | 340/825.72 |
| 2006/0112700 A1 * | 6/2006 | Choi et al. | 62/126 |
| 2006/0190138 A1 * | 8/2006 | Stone et al. | 700/276 |
| 2007/0100513 A1 * | 5/2007 | Asano | 701/2 |

FOREIGN PATENT DOCUMENTS

| | | |
|---|---|---|
| EP | 1316908 A1 | 6/2003 |
| JP | 2002057971 A * | 2/2002 |
| KR | 2005110220 A * | 11/2005 |

OTHER PUBLICATIONS

International Search Report and Written Opinion mailed Feb. 6, 2008 (7 pgs.).

International Preliminary Report on Patentability mailed Jul. 23, 2009 (7 pgs.).

Extended European Search Report, Mailed Nov. 26, 2010, 6 pages.

* cited by examiner

SYSTEM AND METHOD TO PROGRAM AIR CONDITIONER MODULES

FIELD OF THE INVENTION

This invention relates generally to programming a plurality of microcomputers and more specifically to programming a plurality of microcomputers associated with bus rooftop air conditioner modules.

BACKGROUND OF THE INVENTION

The modern trend for air conditioning buses used in transportation is to locate air conditioner modules on the roof of the bus. Each air conditioner module typically includes at least one microcomputer used to supervise and control the functions of the air conditioning module. The microcomputer runs a computer program generally installed at the time of air conditioner module production.

Another trend in microcomputer based apparatus is periodic revision of the microcomputer software in a post production environment. The software update might be performed to correct a flaw in the software, to adapt the microcomputer based apparatus to a new configuration, or simply to install the latest version of the appropriate code. Typically such updates are done from a personal computer via a cable connected from the personal computer to the microcomputer based apparatus.

In the case of bus roof top air conditioner modules, such manual connections for microcomputer re-programming can be problematic. Most importantly, there is some physical danger to the technician involving climbing to the roof and working at a significant height above a typically hard surface, such as a concrete bus garage floor. Time is also a factor since it is now common for larger buses to have four or more rooftop air conditioner modules and the microcomputer in each module needs to be updated. Another problem is that if a technician is distracted, it is possible that one or more of the rooftop modules is not updated and is left operating on a different version of the microcomputer code.

What is needed is a system and method to ensure that all microcomputers associated with bus rooftop air conditioner modules are programmed with the same software update without requiring a technician to climb on the bus rooftop.

SUMMARY OF THE INVENTION

In accordance with one aspect of the invention, a system to program microcomputers associated with a plurality of bus rooftop air conditioners comprises a plurality of air conditioner modules located on a bus rooftop. Each air conditioner module includes a microcomputer. Each microcomputer is connected to a CAN (computer area network) bus connection, and the CAN bus is common to each microcomputer. The system also includes a programming device that is communicatively coupled to at least one of the microcomputers of one of the plurality of air conditioner modules, wherein the programming device transfers a software update to the at least one of the microcomputers followed by the at least one of the microcomputers transferring the software update to each of the microcomputers in the of air conditioner modules located on a bus rooftop.

In accordance with another aspect of the invention, a method for programming a plurality of microcomputers contained within a plurality of bus air conditioning modules comprising the steps of: providing a plurality of bus air conditioning modules having air conditioning module microcomputers on a microcomputer network; providing a programming device; connecting the programming device to one of the microcomputers; establishing a communications link between the programming device and the one of the microcomputers; programming the one of the microcomputers; commanding the one of the microcomputers to broadcast the program to the other microcomputers on the microcomputer network; and commanding all of the microcomputers to run the program.

BRIEF DESCRIPTION OF THE DRAWINGS

For a further understanding of these and objects of the invention, reference will be made to the following detailed description of the invention which is to be read in connection with the accompanying drawing, where.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Definitions: A microcomputer is defined herein as synonymous with a microcontroller, microprocessor, and a DSP chip. Moreover, a microcomputer can also be any integrated device that can run program code in software or firmware, including a field programmable gate array programmed to perform microprocessor type functions. A programming device can be a computer that is programmed to perform the functions of a programmer for programming microcomputers. Typically such a computer can be a hand held computer, a laptop computer, or a desktop computer situated in the vicinity of the microcomputer to be programmed. The programming device can also be a special purpose, limited use computer, dedicated to programming tasks.

Figure 1:
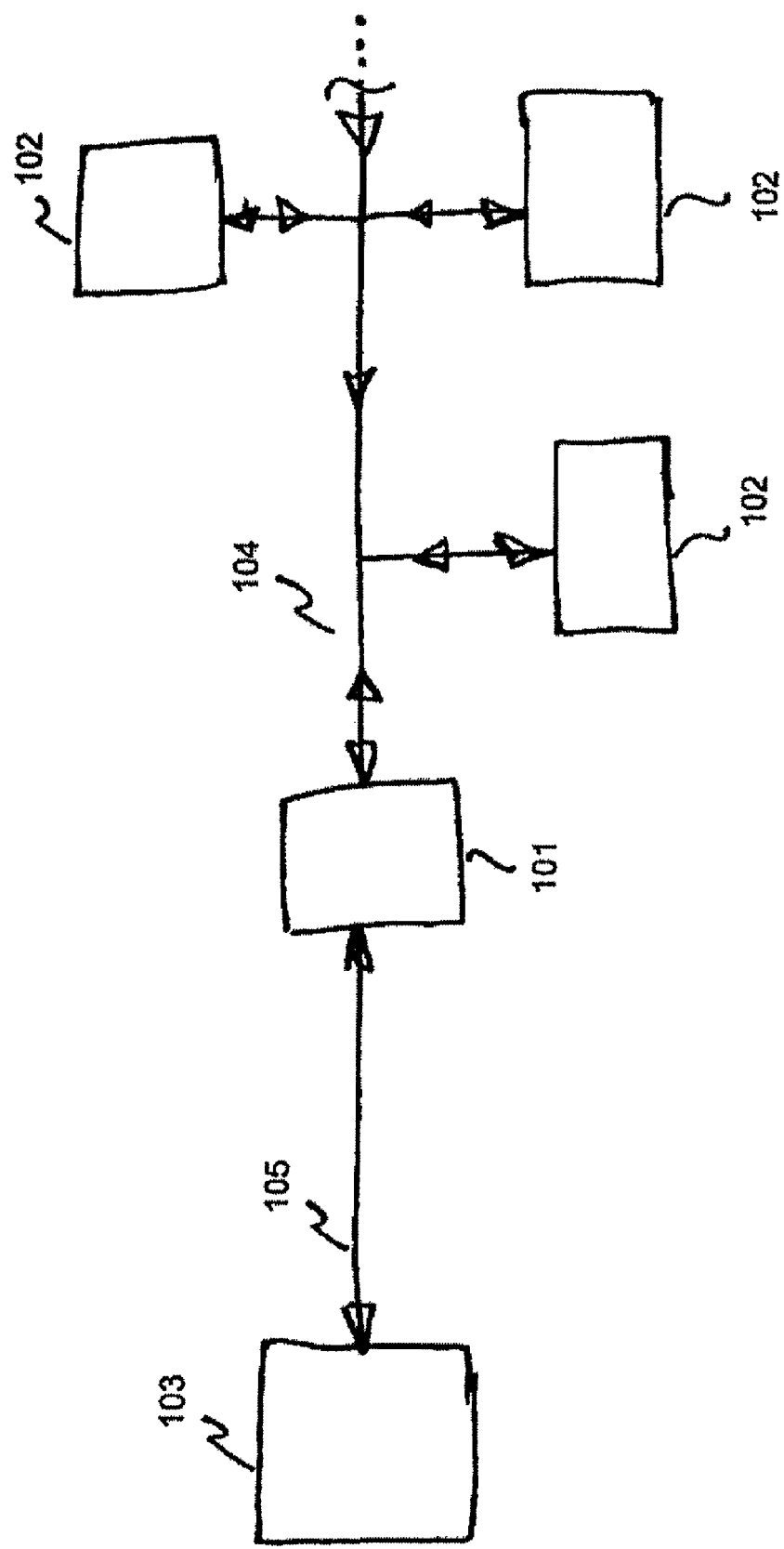
FIG. 1 shows a block diagram one embodiment of a system according to the invention for programming a plurality of microcomputers situated on the rooftop of a bus.

FIG. 1 shows a block diagram of one embodiment of the inventive system for programming a plurality of microcomputers 101 and 102 some or all of which can be situated on the rooftop of a bus. Programming device 103 can be electrically connected to a microcomputer 101, typically via a serial data link 105. The connection can be any suitable electrical connection that can support the transfer of digital data between programming device 103 and microcomputer 101. Microcomputer 101 can also be communicatively coupled one or more microcomputers 102 via a microcomputer bus 104. Microcomputer 101 is typically of the same type as microcomputers 102, and microcomputer 101 is so labeled only to identify a specific one of the microcomputers as connected to programming device 103 via serial data link 105. Typically, any of the microcomputers 102 can equally take the place of microcomputer 101, with an appropriate serial data link 105 connected to that microcomputer, such as any of the microcomputers 102.

Figure 2A:
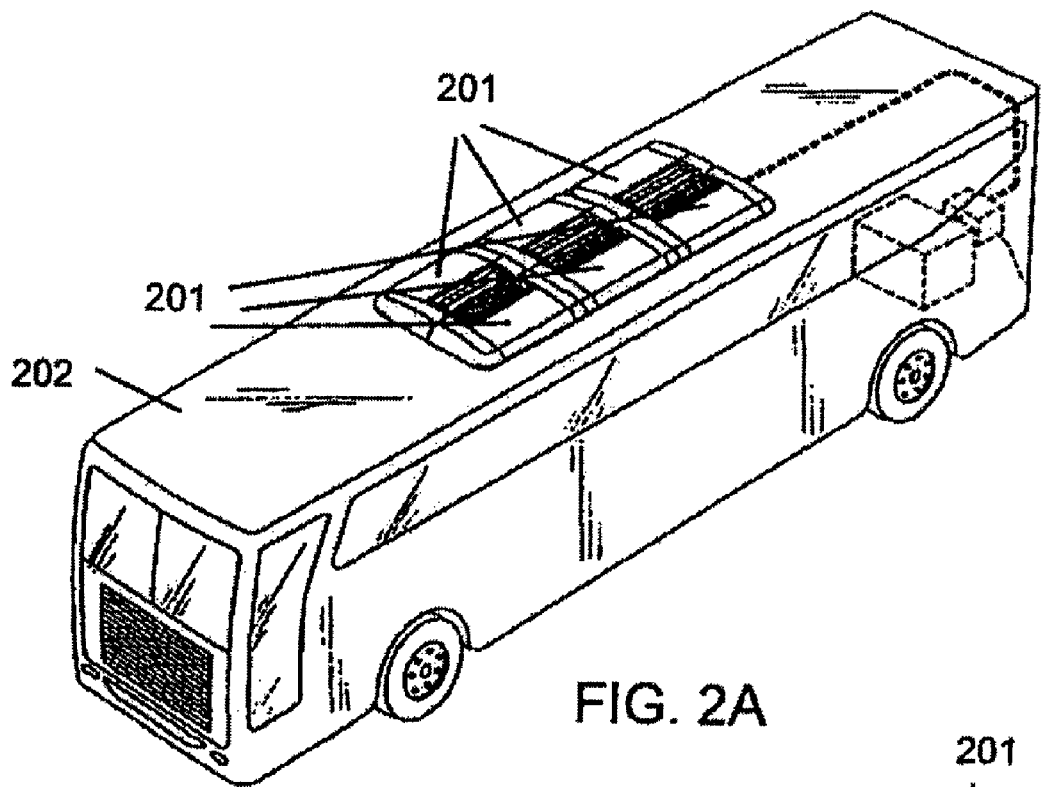
FIG. 2A and FIG. 2B show two exemplary layouts for mounting air conditioning modules 201 on the rooftop of a bus.
Figure 2B:
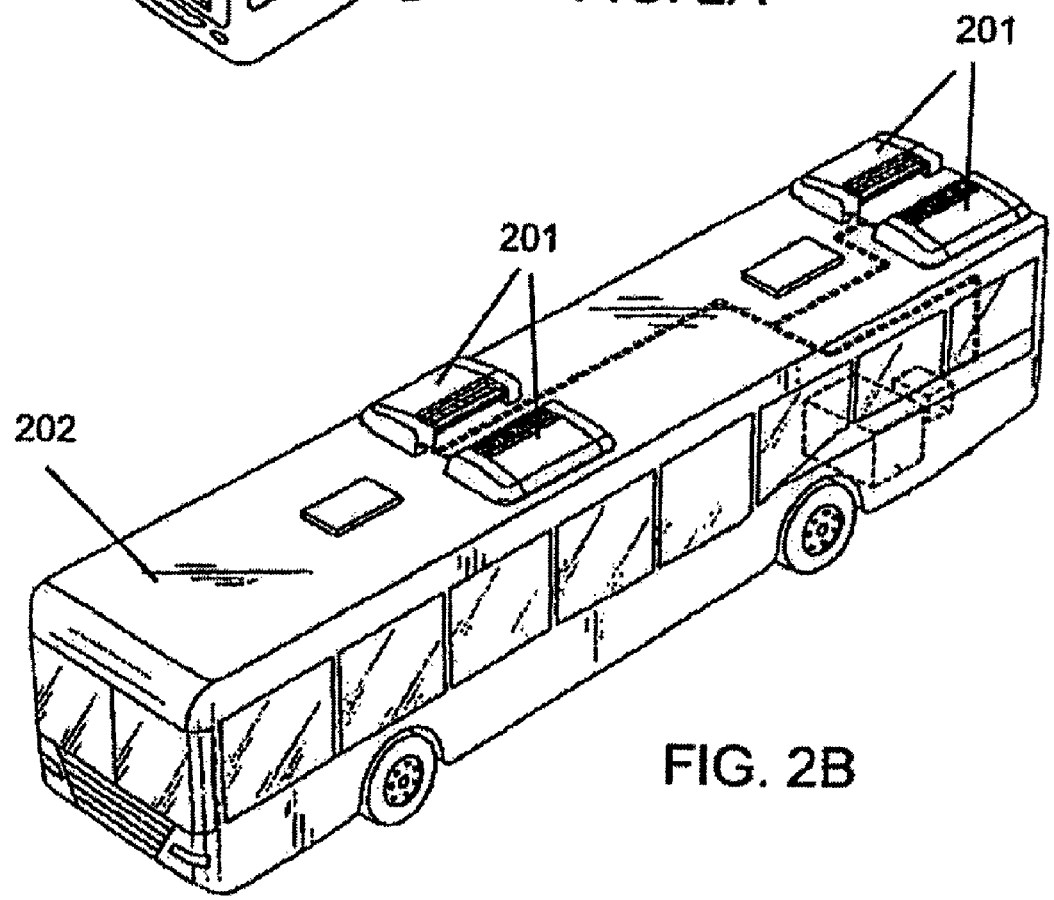

FIG. 2A and FIG. 2B show two exemplary layouts for mounting air conditioning modules 201 on the rooftop of a bus 202. Such air conditioning modules are available from the Carrier Corporation of Syracuse, N.Y. Similar air conditioning modules were described in more detail in U.S. Pat. No.

6,925,826 B2, "Modular Bus Air Conditioning System", issued to Hille, et al. and is hereby incorporated by reference in its entirety. These layouts are merely illustrative of the modules, and not intended to be limiting as to the number of modules or position of each module. For example, a module 201 can also be mounted on the rear of a bus, usually in the vicinity of a rear window. A connection to serial data link 105 can be provided in any convenient location, such as within an access door or compartment on the inside or outside of bus 202 (not shown in FIG. 2A or FIG. 2B). The connection to serial data link 105 can be in the form of an electrical connector on a surface or wall, typically in a protected location. Or, the connection to serial data link 105 can also be in the form of a "pig tail", a cable terminated with a suitable connector. Such a connector can accept a cable from programmer 103 or a long enough pig tail can plug directly into a programmer 103. The cable that provides serial data link 105 can thus be advantageously located such that programming device 103 can be situated in any user accessible location, such as in a location where a technician can easily access the programming device 103 without climbing on or near the roof of the bus. Suitable locations for positioning programming device 103 include bus 202 surfaces at a level that allow for easy access by a technician standing on the ground outside of the bus 202 or while standing or, preferably sitting, within the bus 202.

Figure 3:
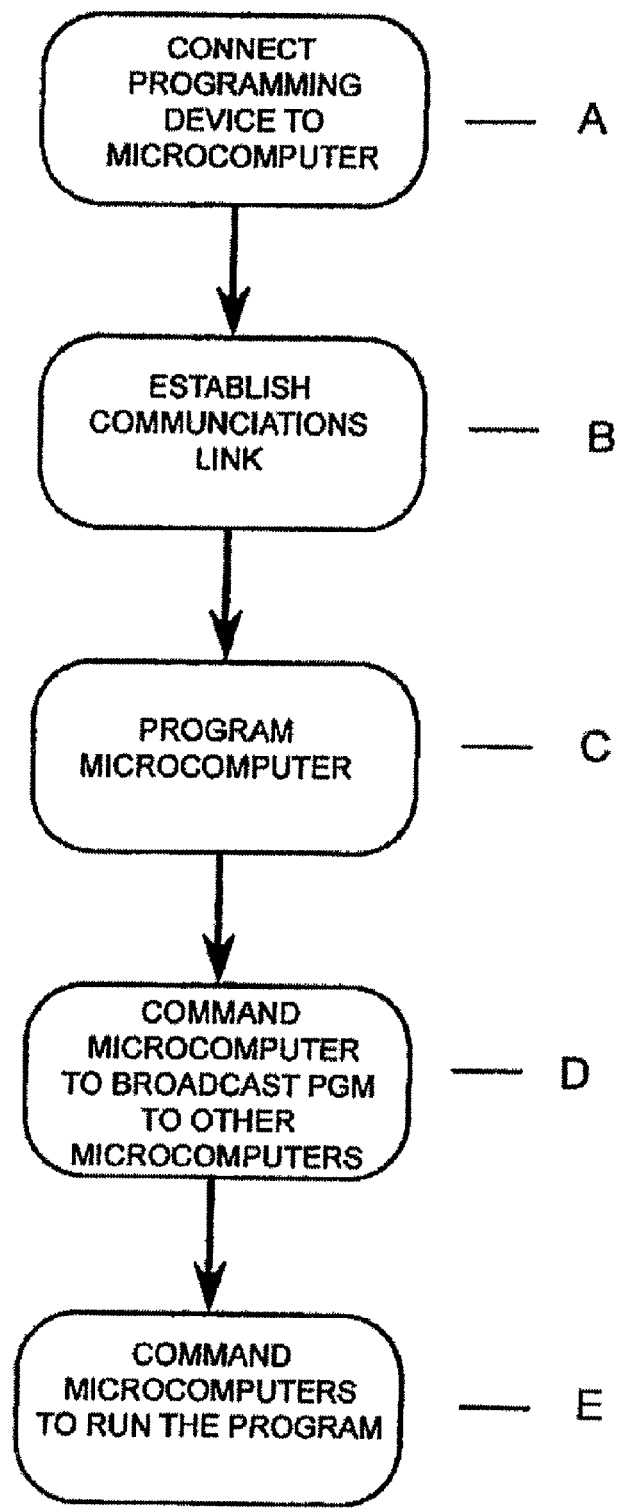
FIG. 3 shows one embodiment of steps useful for performing the inventive method.

FIG. 3 shows one embodiment of steps to perform the inventive method. In STEP A, programming device 103 is connected to a microcomputer 101. In STEP B, programming device 103 establishes communications with the microcomputer 101. In STEP C, programming device 103 programs microcomputer 101 by transferring a program to it in a digital data transmission. In STEP D, programming device 103 commands microcomputer 101 to broadcast the program to the other microcomputers on microcomputer bus 104. And finally in STEP E, programming device 103 commands all microcomputers to run the program. This last step can typically be performed by a direct command from programming device 103 to microcomputer 101 for relay of the command to all other microcomputers across microcomputer bus 104. Step E can also be performed by causing a system reset of all microcomputers on microcomputer bus 104.

Suitable serial protocols for serial data link 105 include RS-232, RS-485, USB, as well as a data bus connection similar to microcomputer bus 104. Any suitable controller area network (CAN) can be used for microcomputer bus 104.

A portion of the inventive system was tested using a Dell laptop computer as the programming device. A preliminary Carrier Corporation marathon controller, comprising a DSP chip manufactured by the Motorola Corporation of Tucson. Ariz., was used as microcomputer 101. It is contemplated that a complete a system of air conditioning modules including microcomputers on a CAN bus can perform the remainder of the system and method as described herein.

Advantageous aspects of the inventive system and method include safety and reliability. A technician no longer needs to climb or work in awkward and potentially dangerous positions since all of the microcomputers in the air conditioning modules on a bus can be programmed from a single safe location. Reliability of the bus air conditioning system is also enhanced, since there is little risk of forgetting to re-program or update the software in one or more of a group of air conditioning modules. This ensures that the microcomputers in all of the air conditioning modules on a bus will be running the same version of code.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:
1. A system to program microcomputers associated with a plurality of bus rooftop air conditioners comprising:
    a plurality of air conditioner modules located on a bus rooftop, each air conditioner module including a microcomputer, each microcomputer connected to a CAN (computer area network) bus connection, the CAN bus common to each microcomputer; and
    a programming device communicatively coupled to at least one of the microcomputers of one of the plurality of air conditioner modules, wherein said programming device transfers a software update to install an updated version of software code to said at least one of the microcomputers followed by said at least one of the microcomputers transferring said software update to each of the microcomputers in the of air conditioner modules located on a bus rooftop.

2. The system of claim 1, wherein said programming device is a hand held programmer.

3. The system of claim 1, wherein said programming device is a personal computer.

4. The system of claim 3, wherein said personal computer is a laptop computer.

5. The system of claim 1, wherein said programming device is communicatively coupled via a serial bus.

6. The system of claim 5, wherein said serial bus is an RS-232 bus.

7. The system of claim 5, wherein said serial bus is a USB bus.

8. The system of claim 5, wherein said serial bus comprises a direct connection to the CAN bus.

9. The system of claim 1, wherein said programming device is communicatively coupled to said at least one of the microcomputers via serial data link having a cable terminated with a connector for mating with said programming device, said cable located such that said programming device is situated in a user accessible location.

10. A method for programming a plurality of microcomputers contained within a plurality of bus air conditioning modules comprising:
    providing a plurality of bus air conditioning modules having air conditioning module microcomputers on a microcomputer network;
    providing a programming device;
    connecting the programming device to one of the microcomputers;
    establishing a communications link between the programming device and the one of the microcomputers;
    programming the one of the microcomputers by transferring a software update to install an updated version of software code to the one of the microcomputers;
    commanding the one of the microcomputers to broadcast the software update to the other microcomputers on the microcomputer network; and
    commanding all of the microcomputers to run the software update.

\* \* \* \* \*